United States Patent [19]

Powers et al.

[11] Patent Number: 5,151,660
[45] Date of Patent: Sep. 29, 1992

[54] CERAMIC CAPACITANCE HIGH PRESSURE FLUID SENSOR

[76] Inventors: Kelly R. Powers, 6732 South 2485 East, Salt Lake City, Utah 84131; Tony G. Curtis, 253 East Whitlock Ave., Salt Lake City, Utah 84115; Santosh Y. Limaye, 1440 Sandpipe Cir. #38, Salt Lake City, Utah 84117; Robert D. Roy, 715 East 4th Ave., Salt Lake City, Utah 84103

[21] Appl. No.: 577,862

[22] Filed: Sep. 5, 1990

[51] Int. Cl.$^5$ .................................... G01R 27/26
[52] U.S. Cl. ..................... 324/689; 324/663; 324/664; 324/686; 361/285
[58] Field of Search ............ 324/658, 663, 664, 686, 324/689; 361/281, 285, 320

[56] References Cited

U.S. PATENT DOCUMENTS

| | | | |
|---|---|---|---|
| 3,025,464 | 3/1962 | Bond | 361/285 X |
| 3,977,660 | 8/1976 | Nakahira | 427/34 X |
| 3,988,405 | 10/1976 | Smith et al. | 361/320 X |
| 4,074,184 | 2/1978 | Dechene et al. | 324/663 X |
| 4,089,038 | 5/1978 | Bacher | 361/320 |
| 4,196,004 | 4/1980 | Berretz | 427/376.4 X |
| 4,777,431 | 10/1988 | Day et al. | 324/663 X |
| 4,978,921 | 12/1990 | Indig et al. | 324/72.5 X |
| 4,990,855 | 2/1991 | Niedrach et al. | 324/71.3 X |
| 5,017,879 | 5/1991 | Lucas et al. | 324/663 |

Primary Examiner—Kenneth A. Wieder
Assistant Examiner—Glenn W. Brown
Attorney, Agent, or Firm—Trask, Britt & Rossa

[57] ABSTRACT

A ceramic bodied sensor having helical metallized electrodes for measuring the capacitance of an oil-water-gas or oil-water mixture flowing through a central bore of the sensor is disclosed. The sensor generally is a hollow cylinder with an inner ceramic layer which is very thin, a thicker outer ceramic layer which forms a strong structural unit, and a pair of isolated metallized electrodes which are generally approximately located between the inner and outer ceramic layers. The inner ceramic layer, outer ceramic layer and metallized electrodes form a dense monolithic ceramic tube. The electrode plates are preferably identical in size and shape and are isolated from one another electrically so that a condenser is formed by the separated plates. The inner ceramic layer is preferably very thin to minimize its capacitance value in comparison to the capacitance value of the water-oil-gas or oil-water mixture flowing through the central bore of the sensor. the sensor measures changes in the capacitance with changes in composition of the oil-water or oil-water-gas concentrations. Because the dielectric properties of oil and/or water and/or gas are considerably different, the relative composition of each fluid component can be mathematically modeled and thus measured.

5 Claims, 3 Drawing Sheets

CERAMIC CAPACITANCE HIGH PRESSURE FLUID SENSOR

BACKGROUND OF THE INVENTION

1. Field

The instant invention relates to capacitance-type sensors for measuring changes in capacitance due to changes in compositional concentrations of an oil-water-gas or oil-water mixture, especially in a dynamic, that is, flowing, oil-water-gas system.

2. State of the Art

Sensors of various types have been used to measure the concentrations of water and gas in oil. It is often useful to know whether in undersea operations there is water leaking into the oil so that values can be periodically compared to determine changes in water content or in situations of ownership transfer or multiple mixture ownership where precise measurement of composition is required. Some such sensors have used the impedance of the mixture in order to measure changes in impedance and thus determine changes in concentrations. Impedance-type sensors, however, have to have the electroconductive member in contact with the fluid.

However, because of the erosion and corrosion characteristics of the flowing liquid, the use of metal films generally has not been satisfactory. Thus, a pair of exposed metal conductors on either interior lining of the bore of the sensor can be quickly eroded. Additionally, the variation in electrical impedance of the mixture components, independent of the true mixture composition, makes precise measurement impossible.

Capacitance-type sensors are also useful, however, the capacitance plates cannot be readily exposed to the moving fluid since the fluid components are relatively electrically conductive, thus shorting the capacitance plates. The capacitance plates, therefore, must be electrically isolated from the fluid and from one another. Any material between the capacitance plate and the fluid, of course, will also affect the overall capacitance measured by the device. Because of the high pressures involved, e.g. greater than 150 bar, and changes in temperature, any material used to separate the capacitance plates from the fluid must be strong, abrasion resistant, and have a low permittivity and low thermal coefficient of expansion.

SUMMARY OF THE INVENTION

A unique sensor for sensing the capacitance of an oil-water or oil-water-gas mixture having a central bore, a thin layer of ceramic material forming the walls of the bore, a pair of electrodes (capacitance plates) which are substantially identical and opposed to one another encapsulated between an outer substantially thicker layer of ceramic and the inner layer of ceramic with a single electrode lead connected to each electrode has been invented. The ceramic material forming the inner layer of the device is an electrical insulator which is corrosion and abrasion resistant, has predictable low thermal expansion, and which preferably has a low permittivity (dielectric constant). The capacitance electrode plates are isolated from all exterior surfaces of the ceramic-encapsulated device and do not make contact with the fluid passing through the central bore of the device. The inner layer of ceramic, encapsulated electrode, and outer layer of ceramic are sintered into a single, unitary ceramic sensor element.

DETAILED DESCRIPTION

The instant invention relates to a sensor and particularly to a ceramic-encapsulated, capacitance-type sensor for sensing changes in capacitance of an oil-water or oil-water-gas system corresponding to changes in concentrations of the water and/or gas in a flowing oil stream. While capacitance sensors are generally known, the environment and demands of measuring the capacitance of an oil-water-gas mixture, especially in sub-sea environments, places particular requirements and constraints upon a capacitance-sensing element.

A capacitance-sensing element for many applications, e.g. down-hole or underwater sensors, must be able to withstand pressures of at least 100 bar and preferably a minimum of about 200 bar. Furthermore, the sensing element must be very reliable inasmuch as it is in a relatively inaccessible or infrequently inspected location and it is not readily retrievable except with great difficulty and at great expense. Also, the sensing element and its associated hardware must have excellent liquid integrity so that water and liquids cannot leak into the electrical leads, plates, etc.

Additionally, the capacitance inherent in the device must be minimized so that small changes in capacitance of the liquid flowing through the bore of the sensor will be readily detectible. If the capacitance of the device itself is large in comparison to the capacitance of a typical oil-water-gas mixture flowing through it, then minor changes in concentrations of water and/or gas in the oil will result in only minor changes in the capacitance (dielectric constant) of the liquid and will be obscured by the large dielectric constant of the device itself.

Ceramic sensing elements structured in accordance with the instant invention meet the demands for a subsea sensing element which accurately measures the minor changes in capacitance of a flowing oil-water-gas mixture. The unique structure and properties of the ceramic capacitance sensor of the instant invention may render it useful for measuring concentration changes in many fluid mixtures and solutions. Because of the excellent corrosion and abrasion resistance of the ceramic inner wall of the instant sensing unit, it can be used to measure changes in capacitance of corrosive (acidic, caustic) and erosion liquids.

Figure 1:
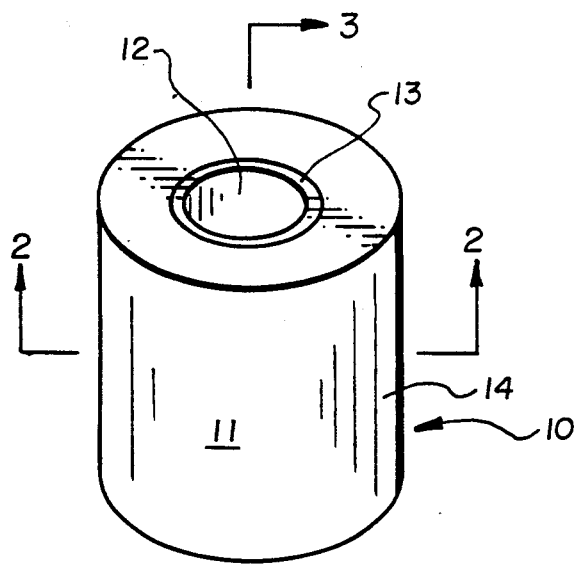
FIG. 1 is a perspective view of the sensing element of the instant invention.

Further description of the invention may be facilitated by reference to the attached drawings. FIG. 1 is a perspective view of a sensing element of the instant invention. The sensing element 10 is preferably a regular right cylindrical device having an external surface 11 and an internal bore 12 through which a liquid oil-gas-water mixture flows. A thin inner layer (bore wall) 13 of ceramic encompasses the bore 12. Preferably, the inner layer forms a right cylinder and has very smooth walls, preferably ones which are erosion and corrosion resistant. It is also preferred that the material in layer 13 has a low, uniformly constant dielectric constant. The bore wall 13 is preferably of a very uniform thinness The ends or edges of layer 13 may be exposed at each end of the device or encapsulated by the outer layer (external wall) 14.

Figure 2:
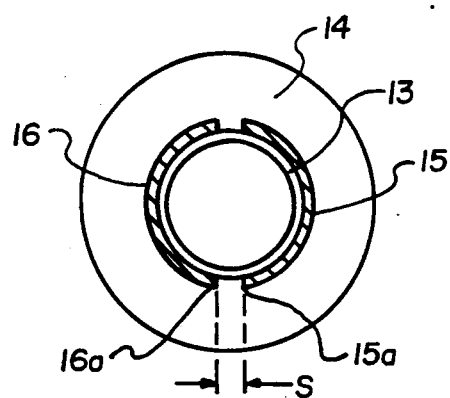
FIG. 2 is a sectional view Of the sensing element along section lines 2—2 of FIG. 1.

FIG. 2 is a sectional view of the sensing element of FIG. 1 along section lines 2—2. The capacitance plates 15 and 16 are illustrated as being embedded at the interface between the external wall 14 and the bore wall 13. The capacitance plates 15 and 16 are metal electrodes which are preferably symmetrical to and directly opposed to one another having a pair of opposed walls, as illustrated in FIG. 2, formed of that portion of inner layer 13 which is directly in front of each opposed electrode. It is also possible that one of the electrode areas is surrounded by a thin, metallicized area which may be connected to ground, therefore reducing any contribution to total capacitance of the space between the margins of the electrode areas closest to one another.

The capacitance plates illustrated in FIG. 2 are two halves of a right cylinder which is symmetrically separated along the longitudinal axis. The plates may be of various shapes but are preferably of the same shape. The electrode (capacitance) plates may be made out of any convenient conductor material, especially metals, and preferably metals which may be formed in a paste which may be applied to an unsintered ceramic tube which forms inner layer 13, and then sintered to form a complete monolithic article. Some metals must be fired in an inert or reducing atmosphere, while other metals may be fired in air. Particular metals useful in the invention are described later. Usually the sintering is done after the outer layer 14 has also been placed around the inner layer 13 and the electrodes.

Figure 3:
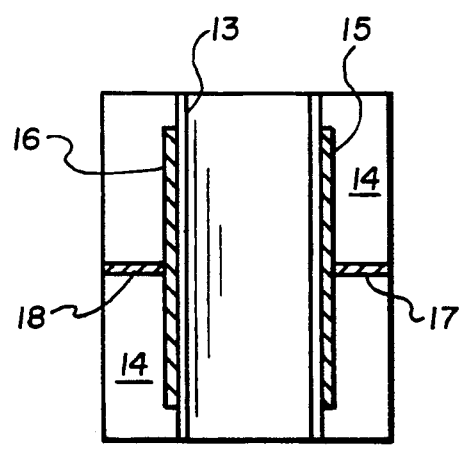
FIG. 3 is a sectional view of the sensing element illustrated in FIG. 1 along section lines 3—3 of FIG. 1.

In FIG. 3, a vertical section along section lines 3—3 of FIG. 1 is illustrated. Electrodes 15 and 16 extend a substantial height of the sensing element to terminate short of either end surface. As illustrated, conductors 17 and 18 are electrical leads which connect the plates 15 and 16 with the external cylindrical surface of the sensing element, and ultimately to the remainder of the electrical circuitry associated with a capacitance-type sensor.

The sensing elements are formed of ceramic materials, especially alumina (90% to 96% purity), in order to meet the various demanding requirements of a sub-sea sensor Plastics, for example, have been tried in sensors of this type but generally have too little strength and too high a coefficient of thermal expansion to be reliably used. The strength and water-tight integrity at the depths and pressures involved require strong materials. As indicated above, the sensor must be designed to be operated at a minimum of 100 bar and preferably at about 200 bar and above. Consistent with this requirement, the distance from a capacitor plate to the fluid whose capacitance (dielectric constant) is to be sensed should be at a minimum and the material should have a very low dielectric constant. Furthermore, the ceramic wall separating a capacitance plate from the liquid stream should be as thin as possible to reduce any contribution to overall capacitance by the wall and the thinness should be very uniform so that any capacitance which is contributed by the wall is uniform.

Ceramic materials, especially alumina, have demonstrated very good properties for such a sensor. Additionally, the capacitance contribution of the sensor walls is dependent on the thickness of the layer between the electrode and the measured fluid. The extremely low and predictable coefficient of thermal expansion of ceramics keeps variations from thermal changes at a minimum. Also, the electrodes are spaced apart at the ends 16a and 15a, for example, and the space "s" is preferably kept as small as possible so that as little capacitance as possible is measured between the ends of the electrodes.

Alumina may be formed, especially by tape-cast methods, into a very thin-walled cylinder having a thickness as low as about 0.5 mm and, more generally, from about 0.5 to 10 mm, and especially from about 1 mm to about 6 mm, for use in such devices. A typical thickness for an inner wall 13 of FIG. 1 is about 2 mm with a tolerance of about ± 0.5%. The outer wall or layer 14 provides a primary structural support. The wall thickness of the inner wall may vary dependent upon the diameter of the internal bore. Inner wall thicknesses of 0.5 to 2 mm may be quite satisfactory for small bore devices having a bore opening of 4 inches or less. The outer wall generally has a minimum thickness of about 5 mm, with the thickness of the outer wall again varying with the diameter of the internal bore. Outer wall thicknesses of 15 to 30 mm may be typical for larger bore devices. The sensor devices have an internal bore frequently from 2 inches (about 50 mm) to about 10 inches (about 250 mm) in diameter. Conventional devices have a minimum bore diameter of about 4 inches (about 100 mm).

Ceramics are an excellent material because of their strength, electrically insulating properties and low dielectric constants. While zirconia may be utilized and is a very strong ceramic, the preferred ceramic is alumina because it has a lower and more consistent dielectric constant than zirconia. The exterior layer, its main purpose being that of a structural member, may be of zirconia, or a zirconia-alumina composition so long as the sintering properties of the exterior and interior ceramic layers are substantially similar. The manufacture of a very thin-walled inner tube or layer, however, is not readily accomplishable by traditional ceramic processing.

The typical method of producing a cylinder or tube of ceramic is to do it by powder pressing in a cavity using an isostatic press with a mandrel and a bag. The powder is filled within the cavity and the item is pressed. Extrusion methods are also often used for tubes of small diameters. Generally, manufacturing of open-ended tubes with larger diameters and very thin walls is not readily accomplishable by a powder pressing or extrusion technique. Since electrodes (plates) must be placed on the exterior surface of the inner cylinder, the cylinder must have precise dimensions, high unsintered strength, uniform thinness and it must be particularly round.

A preferred technique for forming the sensor of the instant invention is to manufacture a ceramic tape by conventional tape-casting techniques. Thin ceramic tapes of alumina are conventionally made for ceramic cofired multi-layered integrated circuit packages used in the electronic industry. In the instant invention, ceramic alumina tape is wound upon a cylindrical mandrel. Such tapes have thicknesses of 0.5 mm or less and usually require multiple layers to form the minimum wall thickness required for the bore wall layer. Ceramic tapes may be as thin as 0.1 mm and thickness of about 0.25 mm are readily achievable. Multiple layers of ceramic tape are formed upon a mandrel until the desired thickness is obtained. Surface activating agents may be sprayed or otherwise applied between tape layers to enhance the bonding of layers during lamination. The mandrel and tape are placed in an isostatic press and are isopressed to a strong green state. The exterior surface of the inner cylinder is then green formed using abrasive paper or other green machining methods to form a smooth, round, cylindrical external surface on the inner tube while maintaining a uniform wall thickness. The green machining may be done either before or after the tube is removed from the mandrel, although generally it is green machined with the tube on the mandrel.

Figure 4:
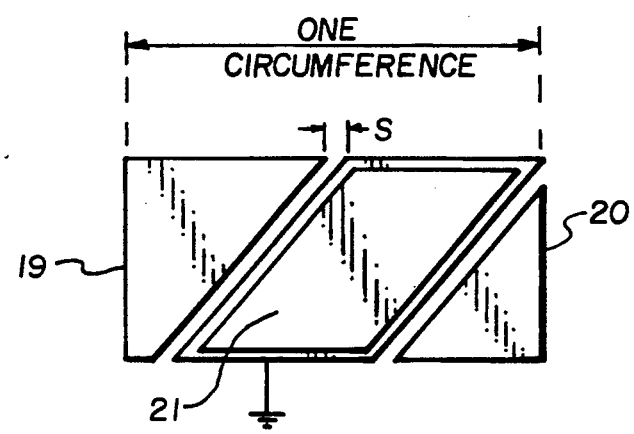
FIG. 4 is a planar electrode (capacitance plate) designed for wrapping around the interior cylindrical ceramic element to form a helically shaped pair of electrodes.

The outer surface of the inner tube is then screen printed by forming a metal paste of a certain configuration on a flat surface and then rolling the cylinder over the paste to adhere electrodes of a proper shape to the tube. In FIG. 4, a preferred electrode design is illustrated so that the capacitor plates on the inner tube are formed in a helical design. Because of the close tolerances involved, the external dimension of the inner tube must be fairly precise so that the circumference of the tube matches the length of the electrode design. The electrode design has one portion 19 which mates with portion 20 to form an electrode (plate) which on the tube has then the same shape as plate 21. Electrodes are formed in this fashion so that the spacing "s" between elements 19 and 21 and between 20 and 21 may be measured precisely. Thus, if there is any error in spacing, the plate element 19 and the plate element 20 may overlap slightly so that the spacings "s" may be precisely maintained.

Figure 7:
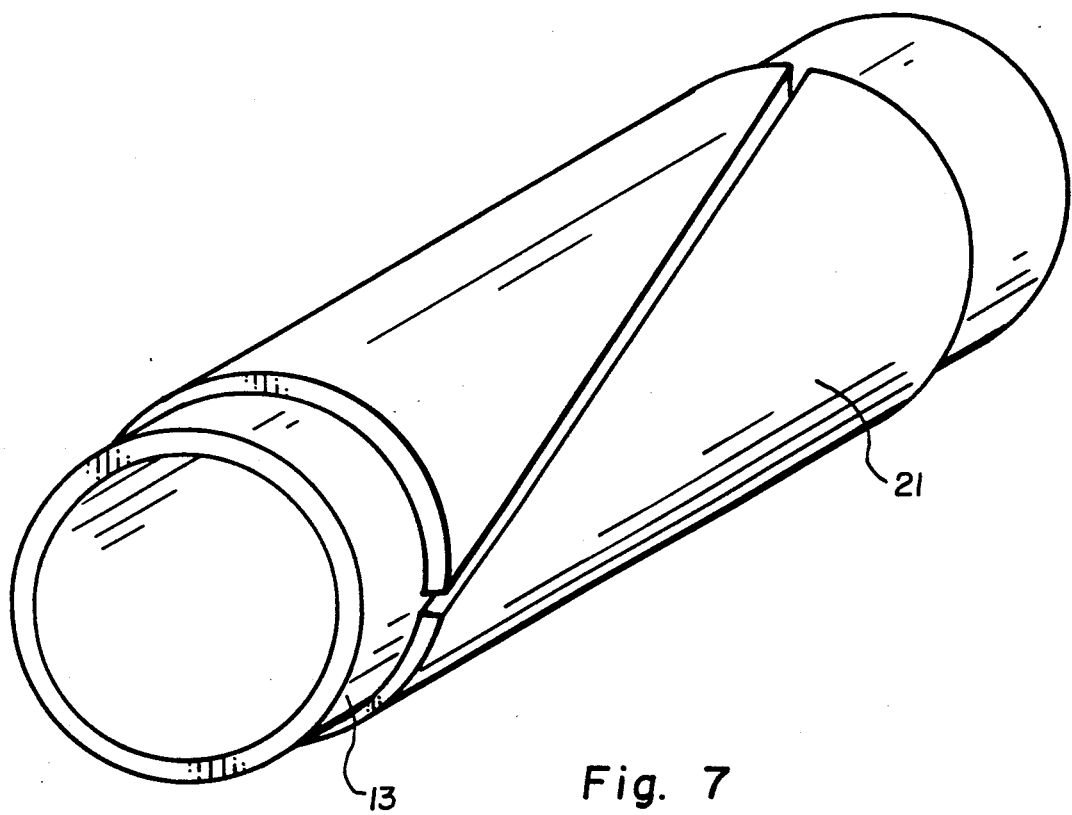
FIG. 7 is a perspective view of an helical electrode pattern on an interior cylindrical ceramic element.

The helical pattern of the electrodes is illustrate in FIG. 7. A helical electrode pattern tends to provide a more reliable measurement of the true capacitance of a moving fluid. The helical pattern illustrated in FIG. 7 results from application of the electrode pattern illustrated in FIG. 4 when such planar pattern as screened upon the cylindrical external surface of the inner wall of the sensor.

While helical electrode patterns have been previously used on sensor elements, the use of such a helical pattern on the very thin-walled inner walls provides excellent results. Furthermore, the sensor of the instant invention, besides using very thin inner walls of a very uniform thickness, totally incapacitates the electrodes in a unitary sensor element wherein the outer wall provides the structural support if of a ceramic material whenever the whole unit is fired (sintered) only once to sinter substantially simultaneously the inner wall, the electrodes and the outer wall. In such a device, the shrinkage of the individual components must be substantially matched so that dimensioned integrity is maintained. The choice of electrode materials and outer wall ceramic composition is such that these are compatible with the sintering characteristics of the inner wall in regard to sintering temperature, shrinkage, densification and the like.

After the inner tube is screen printed, then the inner tube may be used as a mandrel and have more ceramic tape wound in laminate fashion to form the outer wall of the cylindrical sensor. Another technique is to place the inner tube and mandrel in an isostatic press and fill the cavity between the inner ceramic tube O.D. and the isopress elastomeric bag I.D. with ceramic powder and then isostatically press the outer wall around the screen printed inner tube.

As a last step the unit is sintered, i.e. cosintered, to obtain a dense ceramic having its density approximating that of its theoretical density. The interconnect or conductor 17 and 18 may be formed by boring a passageway (via) in the external wall and filling it with an appropriate conductor. Preferably, such a step is carried out while the element is in a green state. Interconnects (electrical leads) may also be wires put in place while the element is in an isostatic press by bonding the leads onto the electrode plates with metallization paste and to the I.D. of the isostatic bag, erg. by adhesive tape, then filling the cavity with powder and pressing.

The interconnect between the electrodes and the external circuity can be put in place after the sensor element is sintered by drilling a passageway (via) from an external wall through the outer wall into the electrode. The passageway is filled with metallic paste, compacted and sintered. Also, a wire may be inserted.

The technique of forming a structural, three-dimensional ceramic device, such as the sensing element described herein, by lay-up of green ceramic tape may be used to form various types of ceramic devices. Traditionally, ceramic tape has been used to form planar, multi-layered devices such as packages for integrated circuits, wherein flat sections of tape, often with metallization circuitry printed upon them, are stacked one upon another and sintered to form a unitary multiple-layer device of thin flat strips.

The lay-up technique of this invention may be utilized to produce various structural shapes such as open-ended cylinders, closed-end tubes, solid and hollow cones, solid and hollow hemispheres and various irregular shapes. The tape may be laid upon a mandrel or mold, which includes sacrificial or wash-out molds. Although ceramic tapes have large quantities of organics such as plasticizers and binders, which result in large shrinkage upon sintering, the tape compositions are well defined and shrinkage is very precisely predictable.

Ceramic tape compositions and powder useful in the instant invention have alumina contents of 90% and 96% in a sintered state. Ceramics having other alumina contents may be useful as well. The dielectric constants for 90 and 96% alumina are generally between 8 and 10 and coefficient of thermal expansion less than $10 \times 10^{-6} °C^{-1}$.

The capacitance of a capacitor is dependent only upon the dielectric constants of the material between electrode plates, the distance between plates and the area of the plates. The electrode plate composition is insignificant so long as it is a good electrical conductor.

Typical metal conductors useful in the instant invention are compositions of tungsten and molybdenum-manganese. These are formed as pastes and painted on the ceramic. Sintering is performed in a hydrogen or other reducing or inert gas atmosphere. Other conductors such as platinum, silver, palladium and the like may be used. These conductors may be sintered in air.

Figure 5:
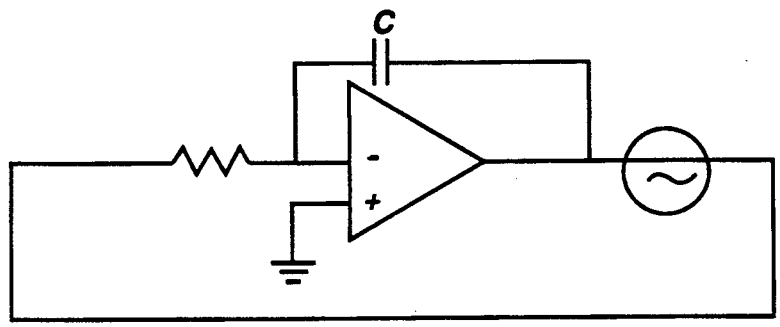
FIG. 5 is a circuit diagram of the basic circuit.
Figure 6:
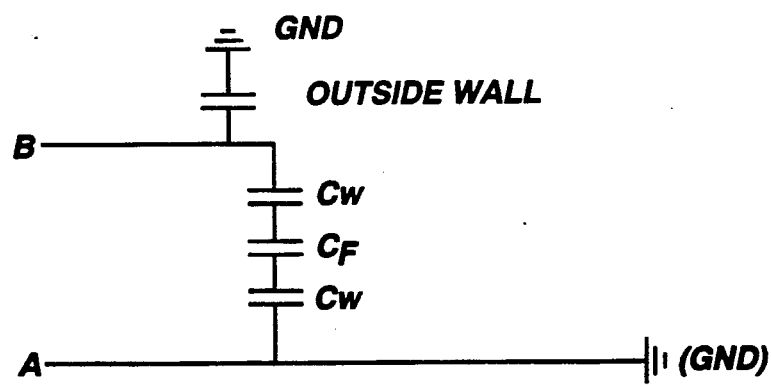
FIG. 6 is a circuit diagram of the capacitance elements of the invention.

The circuitry utilized to measure capacitance is set forth in FIG. 5. This type of circuitry has been previously used with capacitance sensors having a similar purpose but a different structure than the capacitance sensors of the instant invention. The capacitance of the sensor and as represented by the equation:

$$\frac{1}{C} = \frac{1}{C_{w_1}} + \frac{1}{C_F} + \frac{1}{C_{w_2}}$$

wherein $C_{w_1}$ is the capacitance as the capacitance resulting from the ceramic inner wall adjacent to one electrode, $C_{w_2}$ is the capacitance of the ceramic inner wall adjacent the second electrode while $C_F$ is the capacitance of the fluid. The individual capacitances are represent by the circuitry of FIG. 6.

The capacitance of the ceramic wall is determined from the formula:

$$C_w = \frac{EAT}{t}$$

wherein "t" is the thickness of the ceramic wall, "A" is the electrode area and "E" is permittivity (dielectric constant) of the ceramic material. Thus, the capacitance of the ceramic inner wall in contact with the electrode can be calculated. Also, the sensor may be calibrated by measuring the capacitance of a known medium, e.g. air or water or similar fluid.

The circuitry illustrated in FIG. 5 is a resonance circuit in which the sensor capacitance determines the charge or discharge rate of an integrator. The resulting resonance frequency is thus inversely proportional to the sensor capacitance.

EXAMPLE

A capacitance-type sensing element was formed by preparing a slurry and tape-casting a ceramic tape from the following slurry composition:

| Inorganics (% wt. inorganics only) | Organics (% wt - Organics only) |
|---|---|
| Al$_2$O$_3$ - 90% colorants .5% | |
| SiO$_2$ - 4% | |
| Ca(OH)$_2$ - 3% | 50% B79 Butvar |
| Mg(OH)$_2$ - 1% | 45% Santisizer 160 |
| Cr$_2$O$_3$ - 1.5% | 5% Witcomide |

A flexible tape was cast in a tape-casting machine and permitted to dry to a solvent (ethanol, trichlorethane) content of less than 2% by weight. The tape, having a width of about four inches (~10 cm) and a thickness of about 0.01 inch (~0.25 mm), was wound on a fixed press aluminum arbor having a smooth finish (8 microinches) and a nominal diameter of about 5.00 inches and a length of about 30 inches. The arbor was first sprayed with silicone-type release agent and the tape upper surface with sprayed with a laminating enhancing activation agent (binders, solvents). The tape was wound in helical fashion with an overlap over an adjacent wrap of 0.2 to 0.5 inches. Moderate tension was applied during wrapping to assure that no air was entrapped. Subsequent layers of tape wrapped over existing layers are offset so that the seams of one layer are not coincident with the seams of a lower layer. Wrapping of additional layers of tape was continued until the desired overall thickness is achieved, which is generally about 0.02 to about 0.2 inches, although preferably from about 0.04 to about 0.4 inches.

Once the desired number of layers of tape had been wrapped on to the arbor, the whole unit is placed into an elastomeric tube (isostatic press bag) typically having a durometer of 60-70 shore. The bag and wrapped arbor are placed in an isostatic press and subjected to a pressure of 5 to 10 kpsi for a period of typically 5-30 seconds. This densifies the tape by a factor of approximately 1.02, consequently reducing the thickness by a small factor and uniformly adhering green layers to each other.

Upon removal of the densified green tape wrapped unit from the press it is surface finished by rotating the arbor about its longitudinal axis at a high rate of speed, for example about 800-1200 rpm while sanding its external surface with emery sand paper, starting typically with 40 grit paper and ultimately using 600 grit paper. The densified green tape wrapped unit is sanded to a desired uniform wall thickness, roundness (ovality) and degree of surface finish. A finely finished surface is very desirable inasmuch as a paste is painted on the eternal surface.

Although various metal-containing pastes may be used, a platinum paste is screened through a 325 mesh stainless steel screen by simultaneously rolling the tube and passing a squeegee across the screen to "paint" the external finished surface of the unit precisely with a metallic material of a preselected shape which is sinterable to an electroconductive condition to form a pair of substantially opposed, substantially identical metallic electrodes. The electrodes are preferably recessed from either end of the green ceramic unit so that it may be fully encapsulated when an outer layer of ceramic is integrated with the electrode coated inner wall.

Although various means for connecting the electrodes (capacitance plates) with the external electrical circuitry may be employed, a convenient technique is to attach a platinum wire, typically about 0.01 inch diameter, to each metallic paste electrode by using Pt paste as "glue." The other end of the wire can be taped or otherwise attached to the interior of an elastomeric tube (isostatic press bag).

The bag and metallized green ceramic unit, preferably while still on the arbor, are placed in an isostatic press and then filled with unfired alumina powder. The alumina content of the powder is such that after compaction and firing, the sintered outer wall of the sensing element has an alumina content of from about 94% to about 99.8% and preferably about 96%. The unit is isostatically pressed at a pressure of about 1514 20 kpsi for about 5-30 seconds.

Upon removal of the unfired sensing element from the press, it is placed on a lathe and rotated at about 500-1000 rpm about the longitudinal axis of the arbor while machined with a diamond tip tool to the desired thickness, roundness and degree of external surface finish.

The unit is then sintered at a temperature of approximately 1550-1600° C. in air, however, an inert gas, for example, hydrogen or nitrogen, is used when tungsten or molymanganese are used as the electrodes. Typically, a sintering cycle is used which consists of a 27 hour ramp-up period, a two-hour hold period at the set sintering temperature, and a 16-hour ramp-down period.

The outer surface of the sintered sensing element is then ground with a diamond abrasive wheel to achieve the precise O.D., roundness and desired surface finish.

The external (outer) wall of the sensing unit is from about four to about 25 times, preferably about eight to 20 times, as thick as the inner wall. The sintered sensing unit is structurally strong and impenetrable. The electrical lead exposed at the outer surface of the outer wall can be connected to external circuitry. Because of the way the sensing element is used, it is preferred that the electrical leads for the electrodes are exposed at the cylindrical wall rather than at an end surface.

The ceramic sensing element is frequently encased within a heavy-duty metal casing (canister) which has attachment means to enable the sensing element to be positioned within a fluid conduit. Because the ceramic is strong and has a low coefficient of thermal expansion, one preferred encasement technique is to heat the cylindrically shaped metal casing to an elevated temperature and then place the thermally expanded metal casing over the cylindrical ceramic sensing element, then allow the metal to cool to achieve a very strong, shrink-fit, metal-encased ceramic sensing element. Electrical connections to the electrode plates via the sintered-in-place wire are made through the metal casing by way of glassed, grouted, or plastic feed-through connectors.

The instant invention provides a strong, integral unit with a very low and predictable coefficient of thermal expansion and a very low internal capacitance. The encapsulated electrodes are completely isolated from any external environment and are isolated from the fluid whose capacitance is to be measured by a very thin ceramic wall which is structurally strong, an electrical insulator with erosion, corrosion resistance, and a low permitivity. The fluid whose capacitance is to be measured generally contains water and is sufficiently electroconductive that the fluid must not come in contact with the electrodes. Thus, the structural integrity of the ceramic wall separating the fluid and the electrodes is very important.

In the example provided herein, the particular ceramic compositions may be varied according to known conventional techniques. Tape-cast compositions of various ingredients and concentrations may be readily utilized. Various known plasticizers, binders and the like may be readily used as well as different alumina contents and substitution of zirconia or other ceramic powders for alumina. The solvent content of the tape may also be varied within known proportions.

The dimensions and thickness of the tape may be varied, especially within the range set forth elsewhere herein. Also, the type of ceramic powder used to form the outer wall may be varied.

The instant invention meets the various demands for an underwater capacitance-type sensor. A very thin internal ceramic wall surrounding the central bore of the device is provided by a unique layering of thin flexible tapes of ceramic about a mandrel. The layering technique enables the construction of an interior wall much thinner and of a much more uniform, controlled thinness than that obtainable by conventional powder pressing techniques. Also, the layering technique provides an inner wall which may be readily screen printed or painted with a paste which can be fired to an electroconductive state or during the same firing operation which sinters the inner and outer walls of the sensing element.

What is claimed:

1. An integral ceramic capacitive device for measuring changes in capacitance of a fluid flowing therethrough comprising:
   a pair of opposed inner walls, said walls positioned and structured to have a fluid-containing channel therebetween, each of said walls comprising a thin layer of ceramic which is an electrical insulator and which is corrosion and erosion resistant and has a very low coefficient of thermal expansion;
   an outer wall of ceramic which is an electrical insulator and which is sufficiently thick to provide structural strength for said device, said outer wall having a composition and coefficient of thermal expansion substantially similar to said inner wall;
   a pair of thin, substantially continuous, electronically conductive films sandwiched between and adherent to said inner and outer walls of ceramic, said films each being of substantially the same size and shape and substantially opposed to one another and electrically isolated from one another;
   said conductive films each having an electrical conductor attached thereto which extends to an external surface of said outer wall.

2. The ceramic capacitive device of claim 1 wherein said opposed inner walls are opposed walls of a cylindrical tube with two open ends.

3. The ceramic capacitive device of claim 1 wherein the inner and outer walls of ceramic are substantially the same composition and are substantially integral with one another.

4. The ceramic capacitive device of claim 1 wherein the spacing between the conductive film in one wall and the conductive film in another wall is precise.

5. A green ceramic device suitable for sintering into a capacitive-type sensing element comprising:
   a thin inner wall having an exposed surface which forms a central, substantially cylindrical, open-ended bore enclosed by said wall and a pair of electrically isolated, substantially opposed, substantially continuous, symmetrical, thin shapes of metal-containing pastes adherent to said inner wall surface opposite to said exposed surface, said thin inner wall being a green ceramic formed of at least one layer of a thin strip of tape-cast ceramic formed into a substantially cylindrical shape, said tape-cast ceramic shape comprising about 72%–78% by weight inorganic materials and about 22%–28% organic materials;
   a thick outer wall surrounding said inner wall and completely encapsulating said thin, symmetrical areas of metal-containing pastes, said outer wall having a thickness substantially greater than said inner wall, said outer wall comprising about 95% to about 98% alumina and about 2 to about 5 percent binder and/or polyethylene glycol.

* * * * *

UNITED STATES PATENT AND TRADEMARK OFFICE
CERTIFICATE OF CORRECTION

PATENT NO. : 5,151,660
DATED : 9/29/92
INVENTOR(S) : Powers, et al.

It is certified that error appears in the above-indentified patent and that said Letters Patent is hereby corrected as shown below:

On the title page, change the first inventor from "Kelly R. Powers" to --Kelly B. Powers--;

On the title page, change inventor Kelly B. Powers' zip code from "84131" to --84121--;

In the Abstract, line 18, after "sensor." capitalize --the--;

In Column 2, line 5, change "Of" to --of--;

In Column 3, line 55, after "type" insert a comma;

In Column 8, line 45, change "1514 20" to --15-20--.

Signed and Sealed this

Eleventh Day of January, 1994

Attest:

BRUCE LEHMAN

*Attesting Officer*     *Commissioner of Patents and Trademarks*